March 5, 1946.  A. W. BEISHLINE  2,395,838
GYRO-HORIZON TRAINING DEVICE
Filed Oct. 7, 1944

Inventor
ALLEN W. BEISHLINE
By Wilson Jones
Attorney

Patented Mar. 5, 1946

2,395,838

UNITED STATES PATENT OFFICE 2,395,838

GYRO-HORIZON TRAINING DEVICE

Allen William Beishline, United States Navy

Application October 7, 1944, Serial No. 557,713

7 Claims. (Cl. 35—12)

(Granted under the act of March 3, 1883, as amended April 30, 1928; 370 O. G. 757)

This invention pertains to training devices and more especially to devices for use in training students in understanding the significance of the relative position of indicia on flight instruments.

A thorough knowledge of the significance of the relative position of the indicia on the face of a gyro-horizon is important to a pilot since frequently his own sense of direction is upset and it is only through a knowledge of the relationship between the indicia as they appear on the gyro-horizon and the corresponding attitude of the plane that enables him to bring his plane under control. This relationship between the position of the indicia and between the indicia and the position of the plane is acquired only by a repeated comparison of the instrument face with the position or attitude of a plane which causes the indicia to take a given position.

It is an object of the present invention to provide means to facilitate class room training of a student in an understanding of the significance of the indicia on the face of a typical gyro-horizon, which may be manipulated to give him a visual set of indicia corresponding to a given position of a plane in flight from which he may determine the position of the ship, or which he may manipulate to simulate a given position of a ship in accordance with a set of indicia given to him, which will be inexpensive and which will be suitable for instructive purposes for individual or class room study.

To this end and in accordance with a feature of the invention, the device comprises a plurality of relatively movable elements on which are inscribed indicia simulating the face of a gyro-horizon including a vertical index, a horizontal index and a bank scale, the aforesaid relatively movable elements being adapted to be manipulated to position the indicia and bank scale to simulate the attitude of a plane in flight. Specifically, and as illustrated herein, the device comprises three flat structural members superposed on each other and movable relatively with respect to each other to cause indicia thereon to simulate any given attitude of a plane in flight. One of the members has at one end a folded over tab which extends backwardly toward the opposite end, the tip of which terminates in a point adapted to constitute an index representing the vertical. The second flat member lies on the first flat member with one end thereof between the first flat member and the tip, and is held in sliding engagement therewith by straps. A line on the second structural member disposed at right angles to the tab, constitutes indicia representing the horizon. The third flat member which is in the form of a disc has a central aperture therein and is associated with the aforesaid members in such a manner that the aperture overlies the end of the aforesaid tip and the line, the disc being rotatable so that its inner peripheral edge is at a constant distance from the end of the tip during rotation of the disc. A scale is inscribed on the disc adjacent to the inner periphery of the aperture and has a center mark which when registered with the tip indicates horizontal flight transversely of the plane. Projecting into the aperture from one side of the disc, there is a T-shaped member the cross of the T being at right angles to the center mark and adapted when superposed on said line to indicate horizontal flight longitudinally of the plane.

The details and operation of the aforesaid device will now be described with reference to the accompanying drawing, in which.

Figures 1, 2, 3, 4:
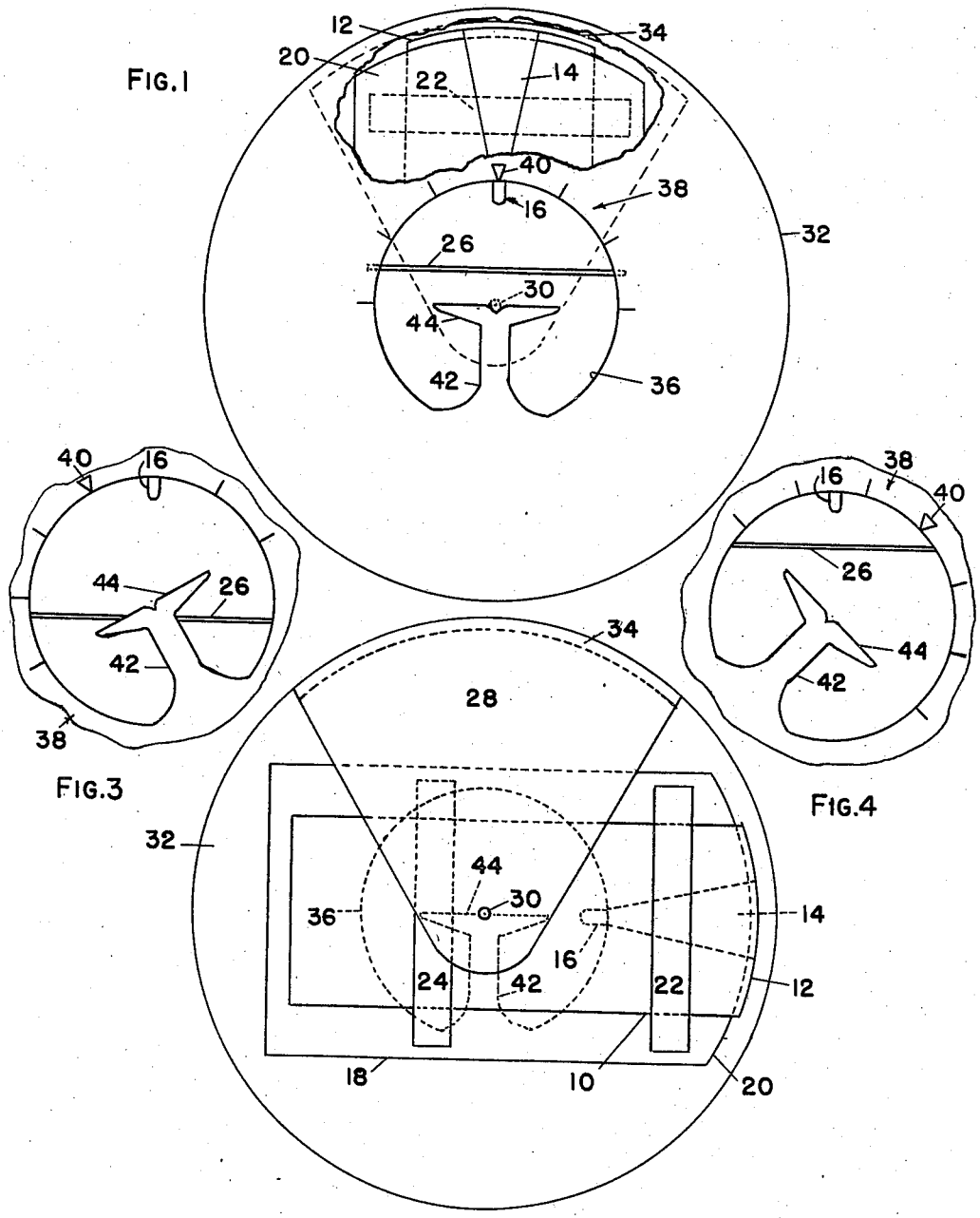
Fig. 1 is a plan view of the face of the device.
Fig. 2 is a plan view of the back of the device.
Figs. 3 and 4 are views of the center of the face of the device illustrating different dispositions of the indicia for different attitudes of flight.

To enable the student more readily to comprehend the attitude, that is the position and direction of a plane in space while in flight solely by observation of the face of the gyro-horizon, it is desirable to give him preliminary instructions in this respect by providing devices which may be used in class room instruction having indicia thereon corresponding to the indicia on the typical gyro-horizon which may be manipulated so as to simulate a given flight attitude and then have the student by observation of the disposition of these indicias, describe the given position or attitude of the plane. Such a device may be employed with equal value in the reverse, that is the instructor may give the student a set of datum of the attitude of a plane at a given moment and have the student manipulate the device to simulate the given conditions. With such a device, a student may become thoroughly familiar with the correlation between the position of the indicia on the face of the gyro-compass and the corresponding attitude of the plane within a short time.

The device, as shown herein, is intended primarily for class room work and comprises in general a base 10, Fig. 2, which is a substantially rectangular member having a curved end 12. Preferably, the member 10 is composed of stiff cardboard as are the rest of the structural members of which this device is composed. However, it is to be understood that component parts of the device as hereinafter related may be made of any sheet material having suitable structural strength, such as metal, wood or one of the synthetic resinous materials. The curved end 12 of the member 10 is provided with a turned over tab 14, Fig. 1, which extends backwardly parallel to the member 10 toward its opposite end, the tab terminating in a tip 16. Between the tab 14 and the member 10 there is disposed a second substantially rectangular sheet member 18 having a rounded upper end 20, the member 18 being slidable longitudinally of the member 10 and being held in slidable engagement therewith by a pair of straps 22 and 24 which overlie the member 10 and are fastened at their opposite ends to the member 18. The member 18 has inscribed on its surface a horizontal line 26 of appreciable width in such a position that a perpendicular to this line at the center portion thereon will pass through the tip 16. In other words, the line 26 is at right angles to the tip 16. On the back of the member 10, there is fastened for rotation with respect thereto, a flat sector shaped member 28, a grommet 30 being employed for rotatably securing the sector shaped member 28 to the member 10. The upper edge of the sector shaped member 28 extends beyond the upper curved end 12 of the member 10 and to this upper edge there is fastened a disc 32, the center of which is concentric with the center of rotation of the sector 28. An arcute spacing member 34 is disposed between the upper edge of the sector shaped member 28 and the disc 32, to take care of the interspersed members 10 and 18, the disc and sector shaped member being glued or otherwise fastened to the opposite sides of the arcuate member 34. The disc 32 has a central aperture 36 therein so located that through the aperture 36 there may be seen the tip 16 and the line 26. At the peripheral edge of the aperture 36, along the upper half thereof is inscribed a scale 38 having a center mark 40. The face of the disc 32 and underlying member 18 which shows through the aperture are preferably black and the tip 16, line 26 and scale 38 are white. It is evident, however, that other contrasting colors may be employed if expedient. The scale 38 rotates with respect to the tip 16 and since the latter is mounted in a fixed vertical position the movement of the scale 38 one way or the other with respect to the tip 16 indicates the roll of the plane about its longitudinal axis. The center mark 40 indicates at a glance which direction of rotation has taken place. There is also formed on the disc 32 at the lower half of the aperture, an upwardly extending neck 42 having a T-shaped head 44, the upper edge of which lies substantially on the horizontal diameter of the aperture 36. The T-shaped head 44 is preferably colored white and rotates with the disc and when its upper edge is parallel to and coincident with the line 26, it indicates that the plane is in a horizontal plane longitudinally thereof, that is, that the center line through the plane from nose to tail is horizontal.

In operation of the device for class room demonstration, the instructor holds the member 10 in a fixed vertical position which therefore maintains the tip 16 in a vertical position and hence simulates the maintenance of the corresponding indicia on the typical gyro-horizon vertical, the latter being held in a vertical position at all times by a vertical seeking gyroscope. In order to illustrate tipping of the plane transversely, that is, rolling about its longitudinal axis, the disc 32 is rotated on the grommet 30 with respect to the member 10 to cause the mid-point 40 of the scale 38 to move to one side or the other of the tip 16. The graduations on the scale will facilitate a visual estimation of the amount of tilt. In order to demonstrate the pitch of the plane, that is, its tilt up or down with respect to the horizon about its transverse axis, the instructor slides the member 18 upwardly or downwardly to move the it as illustrated in Figs. 3 and 4. When the line 26 is above the T-shaped head 44, it is evident that the nose of the plane is down whereas when the line 26 is below the T-shaped head it is evident that the nose is up.

Referring to Figs. 3 and 4 there are shown two specific illustrations of the face of the device under a given set of conditions. In Fig. 3, if the nose of the plane is considered as going into the plane of the drawing, which is the normal direction for the nose when observing the instrument as illustrated, the plane is seen to have rolled counterclockwise about its longitudinal center line since the mark 40 is to the left of the tip 16. Moreover, since the line 26 is below the T-shaped head 44 the nose of the plane is slightly up. The face of the device in Fig. 4, however, indicates that the plane has rolled in a clockwise direction since the head 40 is to the right of the tip 16 and that the nose is down since the line 26 is above the T-shaped head 44.

The invention described herein may be manufactured and used by or for the Government of the U. S. without the payment of any royalties thereon or therefor.

I claim:

1. A device for teaching students in instrument flying, comprising a plurality of relatively movable elements on which are inscribed indicia simulating the face of a gyro-horizon, including a vertical index, a horizontal index and a bank scale, said relatively movable elements being adapted to be manipulated independently of each other to position said indicia and bank scale to simulate any position in which the corresponding indicia and bank scale of a typical gyro-horizon mounted on the panel of a plane in flight might take.

2. A device for teaching students in instrument flying, comprising a plurality of relatively movable elements, indicia on said elements representing a fixed vertical, with respect to the surface of the earth, and indicia on the other elements representing the center line about which the plane rolls and the center line about which the plane pitches, said elements being movable with respect to said fixed indicia to simulate pitch and roll of the plane with respect to the vertical.

3. A device for teaching students in instrument flying, comprising a base, a slide, and a rotatable disc, indicia inscribed on said base, slide and disc to simulate a vertical index, a horizontal index and a bank scale, respectively, said base, slide and disc being adapted to be positioned by relative movement of one with respect to the other to cause said indicia to simulate the position of the corresponding indicia on the face of a gyro-horizon mounted on the panel of a plane in flight for any given attitude.

4. A device for teaching students in instrument flying, comprising a plurality of relatively movable elements on which are inscribed indicia simulating the face of a gyro-horizon, including a vertical index, a horizontal index and a bank scale, said bank scale having a mid-mark thereon which when aligned with the vertical index indicates transverse level flight, said relatively movable elements being adapted to be manipulated to position said indexes and bank scale to simulate the position which the indexes and bank scale of an actual gyro-horizon mounted on the panel of a plane may take in flight.

5. A device for teaching students in instrument flying, comprising a plurality of relatively movable elements on which are inscribed indicia simulating the face of a gyro-horizon, including a vertical index, a horizontal index and bank scale, a mark associated with the bank scale corresponding to a plane through the center line of the ship in normal horizontal flight which when superposed on the horizontal index indicates level flight longitudinally of the ship, said relatively movable elements being adapted to be manipulated to position said indicia and bank scale to simulate the position of corresponding indicia and bank scale of an actual compass mounted on the panel of a plane in flight.

6. A device for teaching students in instrument flying comprising a base having a fixed reference mark thereon representing the vertical as established by a vertical seeking gyroscope, a slide having a reference line thereon representing the horizon, said reference line being fixed at right angles to the fixed reference mark, a disc having a line thereon representing a horizontal plane through the plane of the ship in horizontal flight, said disc being movable with respect to the base to move the line thereon toward and away from the reference line to simulate the pitch of the plane fore and aft with respect to the horizon as established by said reference line, an index mark on the disc, said disc being rotatable on the base to move the index mark to one side or the other of the fixed reference mark to simulate the roll of the plane about the longitudinal axis with respect to the vertical as established by the fixed reference mark, and a bank scale on said disc to facilitate visual estimation of the degree of bank of the plane.

7. A device for teaching students in instrument flying comprising a flat substantially rectangular member having at one end a folded over tab extending backwardly toward its opposite end, said tab terminating in a tip adapted to indicate the vertical, a flat substantially rectangular member superposed on said first flat member with one end between said first member and the tab, a plurality of spaced guide-ways slidably receiving the first rectangle to permit a sliding movement between said members lengthwise of each other, a line on said second rectangular member at right angles to the tip, a disc having a central aperture therein, the disc being superposed on said second named rectangular member, and overlying the tab through which the tip and the horizontal line may be observed, said disc being mounted for rotation on the first rectangular member so that the inner peripheral edge of the aperture is at a constant distance from the end of the tip, a scale on the disc adjacent to the inner periphery of the aperture having a center mark which when registered with said tip indicates horizontal flight transversely of a plane, and a T-shaped member projecting into said aperture from one side thereof, the cross of the T being at right angles to the center mark and adapted when superposed on said line to indicate horizontal flight longitudinally of the plane.

ALLEN WILLIAM BEISHLINE.